(12) United States Patent
Landt

(10) Patent No.: US 8,721,404 B2
(45) Date of Patent: May 13, 2014

(54) DEVICE AND METHOD FOR COMPLETELY REMOVING AT LEAST ONE PART OF THE BREAST CARTILAGE FROM A POULTRY CARCASS THAT IS FREE OF BREAST MEAT

(75) Inventor: Andreas Landt, Lübeck (DE)

(73) Assignee: Nordischer Maschinenbau Rud. Baader GmbH + Co. KG (DE)

( * ) Notice: Subject to any disclaimer, the term of this patent is extended or adjusted under 35 U.S.C. 154(b) by 13 days.

(21) Appl. No.: 13/814,708

(22) PCT Filed: Aug. 23, 2011

(86) PCT No.: PCT/EP2011/064484
§ 371 (c)(1),
(2), (4) Date: Feb. 6, 2013

(87) PCT Pub. No.: WO2012/041610
PCT Pub. Date: Apr. 5, 2012

(65) Prior Publication Data
US 2013/0137353 A1 May 30, 2013

(30) Foreign Application Priority Data

Sep. 30, 2010 (DE) .......................... 10 2010 047 660

(51) Int. Cl.
*A22C 18/00* (2006.01)
(52) U.S. Cl.
USPC ........................................................ 452/149
(58) Field of Classification Search
USPC .................. 452/149–155, 160, 165, 166, 170
See application file for complete search history.

(56) References Cited

U.S. PATENT DOCUMENTS 6,007,416 A * 12/1999 Janssen et al. ................ 452/135
6,283,847 B1 9/2001 Berry et al.

(Continued)

FOREIGN PATENT DOCUMENTS

DE 202009017070 U1 5/2010
EP 2165607 A2 3/2010

OTHER PUBLICATIONS

International Search Report dated Nov. 21, 2011 from International Patent Application No. PCT/EP2011/064484 filed Aug. 23, 2011 (2 pages).

(Continued)

*Primary Examiner* — Richard Price, Jr.
(74) *Attorney, Agent, or Firm* — Schmeiser, Olsen & Watts LLP

(57) ABSTRACT

The invention relates to an apparatus which is designed and equipped for completely removing at least a part of the breast cartilage from a poultry carcass that is free of breast meat, comprising a transporting conveyor for conveying the poultry carcass in a transporting direction T, said conveyor having at least one support body for receiving and fixing the poultry carcass, a cutter for separating the breast cartilage or parts thereof from the poultry carcass and a control device for controlling the cutter, which is characterized in that the transporting conveyor is aligned with the or each support body and driven such that a poultry carcass to be arranged on the support body is oriented with its connecting line between the breast bone and the breast cartilage parallel to the transporting direction T, the cutter comprises a double blade which is designed and equipped for longitudinally cutting into the poultry carcass at least along a sub-portion on both sides of the breast cartilage and/or both sides of the breast bone, and the cutter comprises a separating element arranged downstream of the double blade, which is designed and equipped for laterally cutting a connecting region between the breast cartilage and the breast bone, thereby completely removing the breast cartilage from the poultry carcass. The invention further relates to a corresponding method.

15 Claims, 6 Drawing Sheets

(56) References Cited

U.S. PATENT DOCUMENTS

Figure 1:
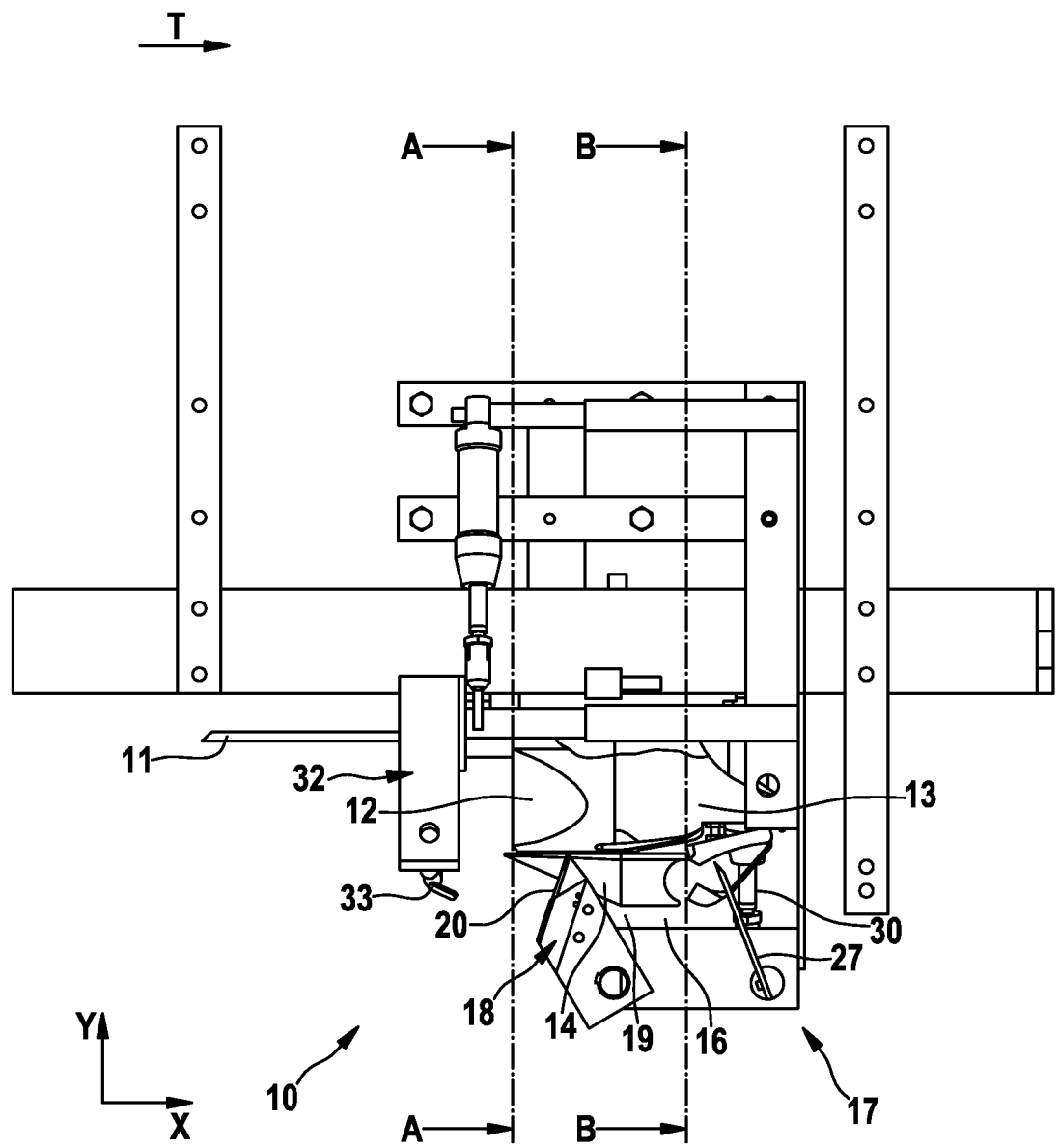

| | | | |
|---|---|---|---|
| 6,736,717 B1 * | 5/2004 | Annema et al. | 452/172 |
| 6,837,782 B2 * | 1/2005 | Hetterscheid et al. | 452/179 |
| 6,921,632 B2 * | 7/2005 | Lim et al. | 435/1.1 |
| 8,308,535 B2 * | 11/2012 | De Vos et al. | 452/136 |
| 8,348,729 B2 * | 1/2013 | Janssen et al. | 452/136 |
| 8,435,100 B2 * | 5/2013 | De Vos et al. | 452/136 |
| 8,460,072 B2 * | 6/2013 | Janssen et al. | 452/136 |
| 2010/0081366 A1 | 4/2010 | De Vos et al. | |

OTHER PUBLICATIONS

Office Action dated Aug. 1, 2011 from German Patent Application No. 102010047660.9 filed Sep. 30, 2010 (5 pages).

* cited by examiner (A-A)

(Z 1:1)

(B-B)

DEVICE AND METHOD FOR COMPLETELY REMOVING AT LEAST ONE PART OF THE BREAST CARTILAGE FROM A POULTRY CARCASS THAT IS FREE OF BREAST MEAT

The present invention relates to an apparatus that is designed and equipped for completely removing at least a part of the breast cartilage from a poultry carcass that is free of breast meat, comprising a transporting conveyor for conveying the poultry carcass in a transporting direction T, said conveyor having at least one support body for receiving and fixing the poultry carcass, a cutting means for separating the breast cartilage or parts thereof from the poultry carcass and a control device for controlling the cutting means. The invention further relates to a method for completely removing at least a part of the breast cartilage from a poultry carcass that is free of breast meat.

Such apparatuses and methods are used, in particular, in the meat and poultry processing industries. Apparatuses or methods, respectively, having the features of the preambles of claim 1 or 13, respectively, are known from the prior art or, more specifically, from experience, respectively. When processing meat/poultry, initially the meat parts relevant for the production of foodstuffs are removed from the poultry carcass and these removed meat parts are then manually or automatically conveyed to further processing stations within a processing line. In this case, in particular, the breast meat is initially removed from the poultry carcass, and thus the poultry carcass is freed of breast meat. The poultry carcass which is free of breast meat essentially comprises a poultry body with corresponding bone parts, such as ribs or respectively costal arch, breast bone (sternum), poultry carcass skin located between the ribs or respectively costal arch, which is a component of the entire poultry carcass, and the breast cartilage connected to the breast bone. In other words, the breast cartilage forms a type of extension of the breast bone.

Due to the economic importance of the breast cartilage as raw material, for example for the pharmaceutical and cosmetic industries, there is an interest in separating the breast cartilage from the remaining poultry carcass and collecting said breast cartilage separately. According to the known apparatus for separating the breast cartilage, the poultry carcass is fixed to a support body of a transporting conveyor and conveyed to the individual processing stations, amongst other things a cutting element. By means of the cutting element, at least a partial separation takes place of the breast cartilage and breast bone, so that the breast cartilage may be finally separated in a further processing station by intervening manually or automatically, for example by tearing the connections which are still present between the breast cartilage and the poultry carcass.

Such methods and apparatuses, however, have the drawback that during the separation or tearing process, respectively, in addition to the actual breast cartilage, parts of the osseous breast bone or parts of the poultry carcass remain on the breast cartilage. The parts separated from the poultry carcass as a result do not exclusively or respectively predominantly consist of the actual breast cartilage but contain an undesirably high proportion of further components. Due to the relatively low density of the breast cartilage material in comparison with the bone components of the poultry carcass, said remaining parts of the poultry carcass and/or the breast bone remaining on the breast cartilage act particularly negatively with regard to the degree of purity of the separated breast cartilage, whereby the breast cartilage defines the mass ratio between the actual breast cartilage material component and the foreign material.

It is therefore the object of the present invention to provide an apparatus which ensures a reliable and accurate separation of the breast cartilage from the poultry carcass. Moreover, it is the object of the present invention to propose a corresponding method.

This object is achieved by an apparatus having the features mentioned hereinbefore in that the transporting conveyor is aligned with the or each support body and driven such that a poultry carcass to be arranged on the support body is oriented with its connecting line between the breast bone and the breast cartilage parallel to the transporting direction T, the cutting means comprises a double blade which is designed and equipped for longitudinally cutting into the poultry carcass at least along a sub-portion on both sides of the breast cartilage and/or both sides of the breast bone, and the cutting means comprises a separating element arranged downstream of the double blade, which is designed and equipped for laterally cutting a connecting region between the breast cartilage and the breast bone, thereby completely removing the breast cartilage from the poultry carcass. By the orientation of the poultry carcass relative to the connecting line between the breast bone and the breast cartilage of the poultry carcass in a direction parallel to the transporting direction T in combination with the double blade it is possible to provide the poultry carcass at the side of the breast cartilage with a double longitudinal cut in an accurate manner. The double blade according to the invention, in a type of pre-cutting process, permits the separation of the breast cartilage from the poultry carcass simultaneously on both sides of the breast cartilage. In other words, the double blade is designed for longitudinally cutting on both sides of the breast cartilage, so that the poultry carcass is completely cut into on both sides, i.e. directly in the boundary region between the breast cartilage and the poultry carcass. By this pre-cutting, undesirable material to the side of the breast cartilage is reliably separated, without however already having to completely remove the breast cartilage from the poultry carcass. The (transverse) connection between the breast cartilage and the breast bone initially remains undamaged and, as a result, after the longitudinal cutting constitutes the only existing connection of the breast cartilage to the breast bone. The separating element according to the invention is provided for the final separation of the breast cartilage or parts thereof, which is arranged in the transporting direction T downstream of the double blade. The design according to the invention of the apparatus permits the fully automatic and reliable separation of the breast cartilage (or parts thereof) from the poultry carcass, the breast bone being able to remain on the poultry carcass.

An expedient embodiment of the invention is characterised in that the double blade is arranged so as to be movable from a waiting position into a cutting position and back again. In other words, the double blade according to said expedient embodiment of the invention is not designed stationary but can be moved to and fro between the waiting position and the cutting position. In the waiting position, the double blade does not come into engagement with the poultry carcass or said double blade, respectively, is positioned such that contact of the double blade with the poultry carcass is reliably avoided. For longitudinally cutting into the poultry carcass, the double blade is moved into the cutting position in which the double blade comes into engagement with the poultry carcass, so that the double blade can penetrate into the poultry carcass. In this manner, the start of the cutting process and/or the end of the cutting process and thus the cutting length of the longitudinal cuts may be precisely and accurately controlled. Preferably, the double blade is stationary after moving into the cutting position, at least during the longitudinal cutting process, i.e. the double blade remains in one and the same position during the cutting process.

Preferably, the longitudinal cutting into the poultry carcass is realised at least along the sub-portion on both sides of the breast cartilage and/or both sides of the breast bone. This is particularly advantageous as the cutting length of the longitudinal cuts may be varied in a freely selectable manner. Thus, on the one hand, it is possible to adapt optimally the cutting length of the longitudinal cuts to the anatomical conditions of the poultry carcass. On the other hand, by determining the cutting length, the size of a connecting web via which the breast cartilage or respectively the breast bone is connected to the poultry carcass after being cut into longitudinally may be varied. The larger this region, i.e. the shorter the longitudinal cut produced by the double blade, the more secure the existing lateral connection between the breast cartilage or respectively the breast bone and the poultry carcass and vice versa.

By the selection of a corresponding cutting length of the double cut performed by the double blade, it may be ensured that a force acting by means of the separating blade arranged downstream on the connecting region between the breast cartilage and the breast bone does not lead to an uncontrolled tearing-off or pulling-off of the connecting webs in the lateral partial region between the breast bone or respectively the breast cartilage and the poultry carcass, which overall would result in an increased proportion of foreign material on the breast cartilage and, as a result, a lower degree of purity of the removed breast cartilage.

The cutting length is, however, preferably selected to be at least sufficiently long that with the subsequent lateral cutting by means of the separating element, no parts of the breast bone remain on the breast cartilage. Thus a reliable and accurate separation of the breast cartilage from the poultry carcass is achieved without undesirable residual parts of the poultry carcass remaining on the separated breast cartilage after completely removing the breast cartilage from the poultry carcass.

The longitudinal cutting is carried out, therefore, essentially through the poultry carcass being moved by means of the transporting conveyor in the transporting direction T relative to the double blade located in the cutting position. In other words, the double blade is fixed in the cutting position, whilst the poultry carcass is moved relative thereto past the double blade in the transporting direction T. Thus, the movement of the poultry carcass, which is required in any case, is used at the same time for conveying said poultry carcass in the transporting direction T and for longitudinally cutting into the poultry carcass. Alternatively, it is also possible to configure the double blade in the cutting position to be movable in or counter to the transporting direction T, so that the longitudinal cutting is additionally assisted by the movement of the double blade counter to the transporting direction T. According to this alternative, the poultry carcass may also be carried out during the temporary stoppage of the transporting conveyor. Naturally it is also possible to move the double blade exclusively in one direction perpendicular to the transporting direction T towards the poultry carcass.

A preferred development of the invention is characterised in that the double blade comprises at least two individual blades spaced apart from one another, the individual blades being oriented at least essentially parallel to one another. By means of the individual blades, the poultry carcass is provided on both sides with the longitudinal cuts in a single operating step. The parallel alignment of the individual blades guarantees a symmetrical cutting pattern relative to the connecting line forming a plane of symmetry between the breast cartilage and the breast bone. Naturally, the individual blades may also be arranged inclined towards one another.

According to a further preferred embodiment of the invention, the spacing between the individual blades may be adjusted so that the spacing between the individual blades can be optimally adapted to the anatomical conditions of the poultry carcass, for example the width of the breast bone and/or the breast cartilage.

A further expedient embodiment of the invention is characterised in that a corresponding counter-surface is assigned to the double blade. By means of the counter-surface, an accurate and precise cutting guidance is ensured during the longitudinal cutting by the double blade, in that a deviation or bulging, respectively, of the poultry carcass is reliably avoided during the longitudinal cutting process. A further advantage of the counter-surface is that the service life of the double blade may be indirectly increased before said double blade loses sharpness due to the signs of wear and has to be replaced. Due to the counter-surface, tearing is reliably avoided during the longitudinal cutting process, even if the double blade is already blunt.

According to a further preferred embodiment, the counter-surface is an integral component of the support body. This permits a particularly compact and simple design of the counter-surface, as the counter-surface is integrated as a corresponding recess directly in the support body fixing the poultry carcass.

A further expedient embodiment of the invention is characterised in that the separating element is arranged so as to be movable from a waiting position into a separating position and back again. In this manner, it may be precisely determined at which exact point the connecting region between the breast cartilage and the breast bone is to be separated. In the waiting position, the separating element does not come into contact with the connecting region between the breast bone and the breast cartilage. As soon as the poultry carcass has been conveyed sufficiently far, by means of the transporting conveyor in the transporting direction T, that the connecting region is positioned between the breast bone and the breast cartilage in a suitable separating position for the complete removal of breast cartilage from the poultry carcass, the separating element is moved by a type of "chopping movement" from the waiting position into the separating position. In the separating position, the separating element comes into engagement with the connecting region between the breast cartilage and the breast bone, so that said connecting region is cut through by lateral cutting.

A further expedient embodiment of the invention is characterised in that the separating element is movably arranged such that when moved from the waiting position into the separating position the separating element has a direction of movement perpendicular to the transporting direction T. This is particularly advantageous, as the cutting speed is independent of the transporting speed of the transporting conveyor T during the lateral cutting of the connecting region between the breast cartilage and the breast bone.

According to a further advantageous embodiment of the invention, the separating element is movably arranged such that when moved from the waiting position into the separating position the separating element has a direction of movement oriented in the transporting direction T, which is inclined by an angle $\alpha$ to a vertical relative to the transporting direction T. The angle $\alpha$ preferably comprises a range of $0<\alpha<90°$. This provides the advantage that the lateral cutting by means of the separating element takes place at least with a partial component towards the transporting direction T. The separating element is thus moved at least relative to a partial component towards the transporting direction T when moved from the waiting position into the separating position. Due to this combined movement, a braking of the poultry carcass or slipping on the support body possibly caused thereby, respectively, is avoided. Furthermore, the force components acting on the separating element in the transporting direction T, due to the further movement of the poultry carcass, are minimised as far as possible.

Advantageously, the separating element is pivotably arranged about a rotational axis D. This provides the advantage that the cutting path arising when laterally cutting the connecting region between the breast cartilage and the breast bone is essentially circular. Thus, the separating element initially enters the connecting region in a substantially perpendicular manner, when pivoted about the rotational axis D, i.e. at the start of the lateral cutting the separating element exclusively has a component perpendicular to the transporting direction T. During the course of the further pivoting movement said component increases further in the transporting direction T due to the pivoting movement. In other words, the angle α to a vertical relative to the transporting direction T alters continuously with the pivoting movement. By the continuous alteration of the angle α with continuing lateral cutting, the speed component of the separating element advantageously also increases in the transporting direction T. In other words, the separating element moves with the poultry carcass, the speed component of the separating element also continuously increasing in the transporting direction T when the separating element penetrates deeper into the connecting region. In this manner, the braking of the poultry carcass and, as a result, possible slipping or buckling of the poultry carcass on the support body is reliably avoided and a precise and accurate cutting guidance ensured.

Moreover, the object is achieved by a corresponding method, comprising the steps: transporting the poultry carcass into a transporting direction T by means of a transporting conveyor having at least one support body for receiving and fixing the poultry carcass such that a connecting line between the breast bone and the breast cartilage of the poultry carcass is oriented parallel to the transporting direction T, longitudinally cutting into the poultry carcass at least along a sub-portion on both sides of the breast cartilage and/or both sides of the breast bone by means of a double blade, and then laterally cutting a connecting region between the breast cartilage and the breast bone thereby completely removing the breast cartilage from the poultry carcass by means of a separating element. The resulting advantages have already been described in connection with the apparatus. To avoid repetition, therefore, reference is made to the corresponding passages of the description.

Figure 2:
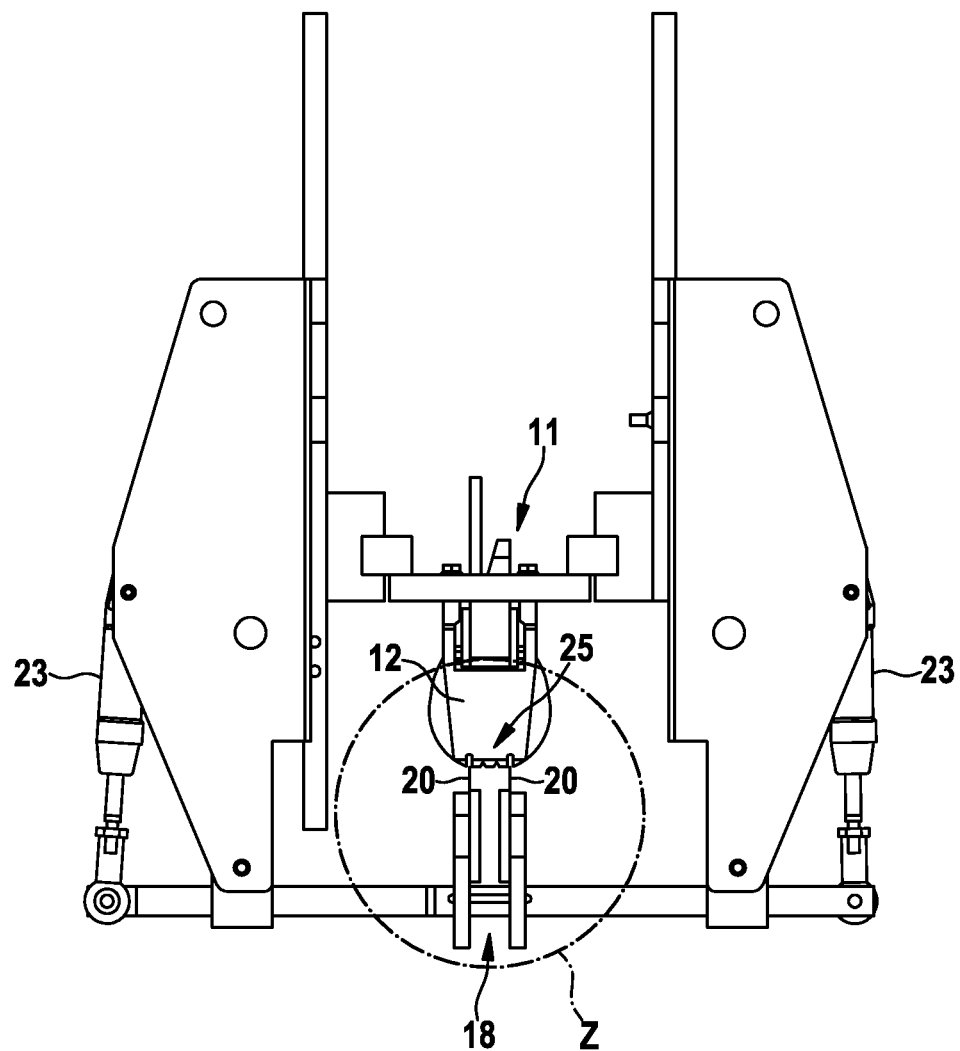
Figure 3:
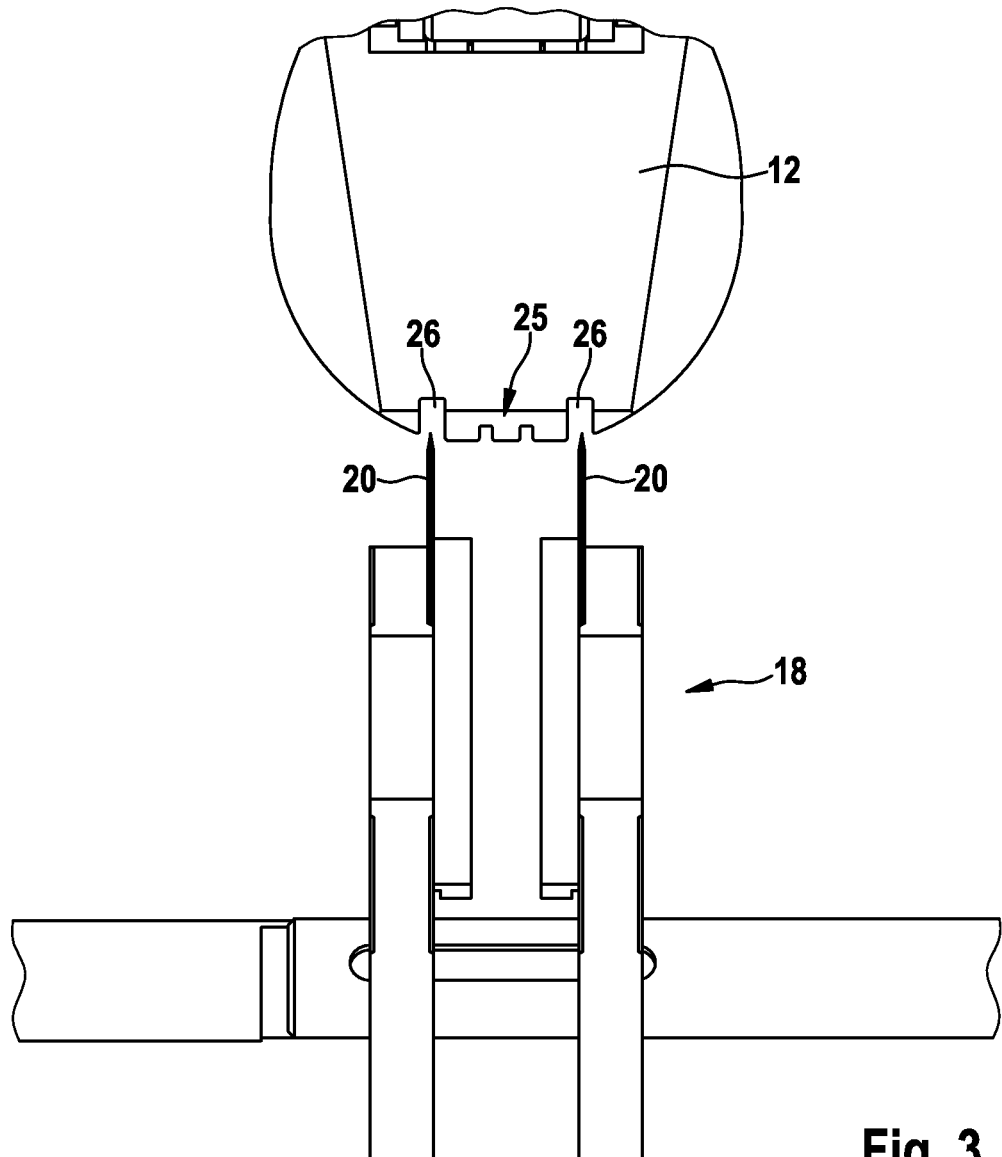
Figure 4:
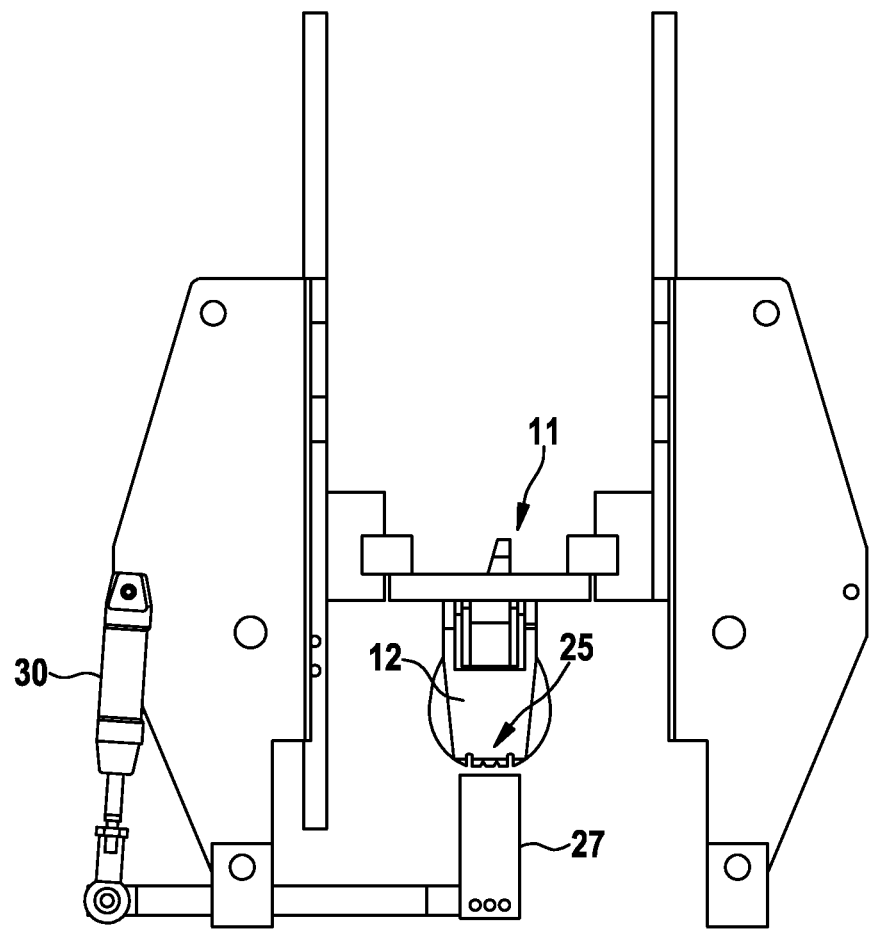
Figure 5:
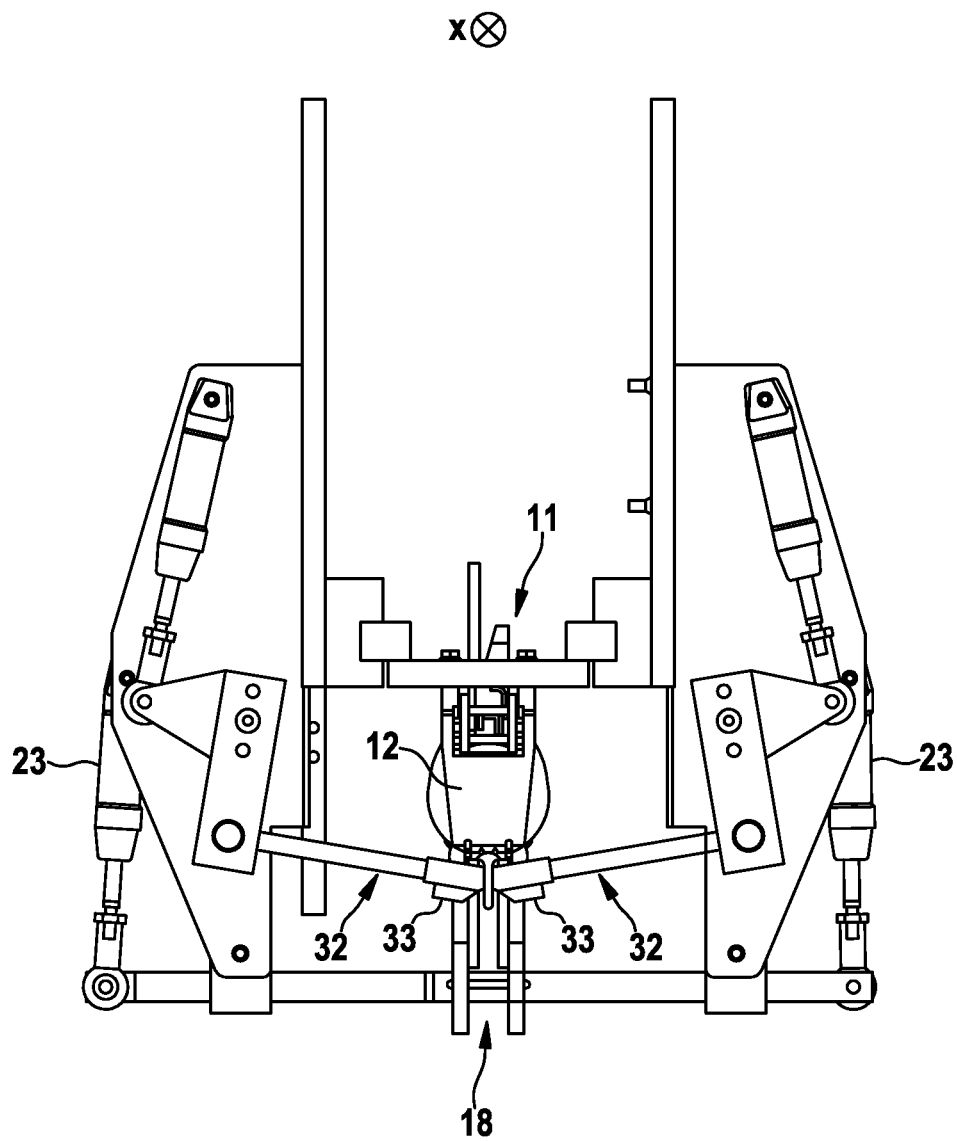
Figure 6:
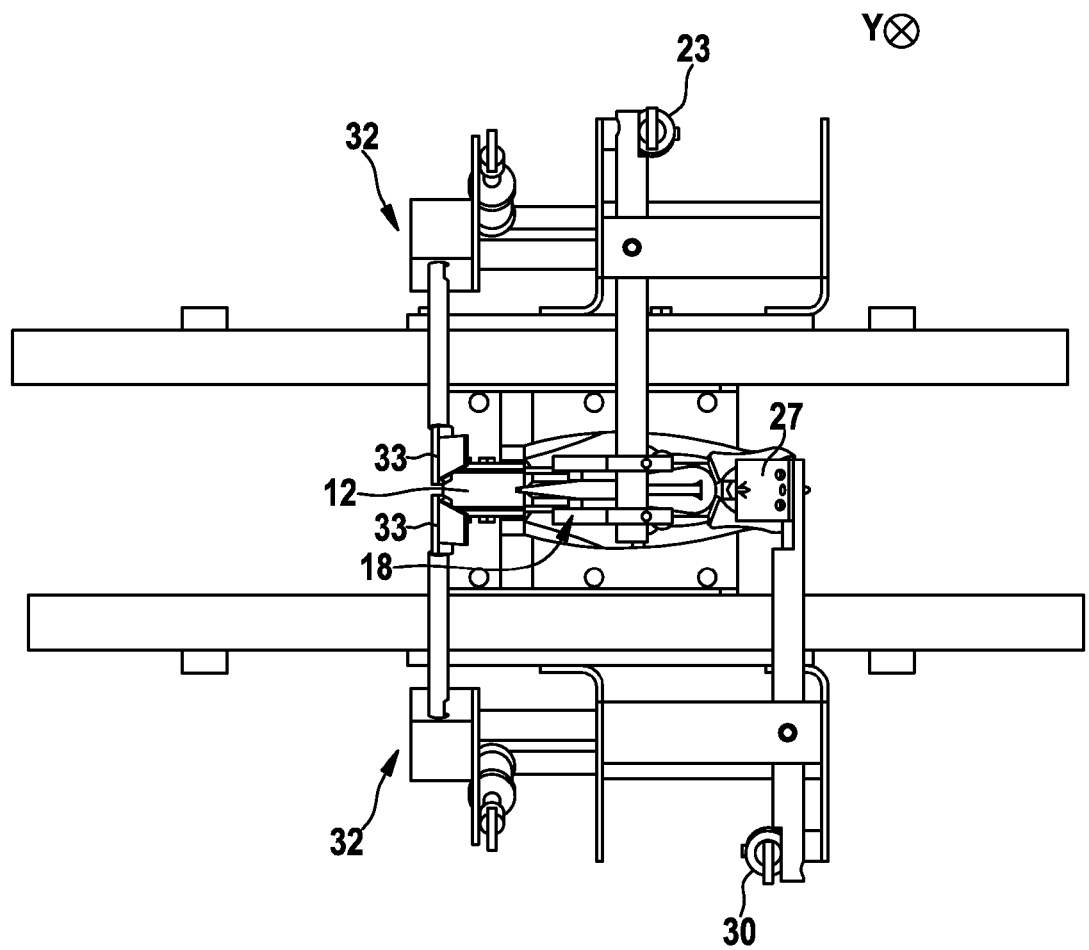

Further preferred and/or expedient features and embodiments as well as method steps are revealed from the sub-claims and the description. A particularly preferred embodiment as well as the method are described in more detail with reference to the accompanying drawings, in which:

FIG. 1 shows a schematic view of the apparatus according to the invention in side view, FIG. 2 shows a sectional view of the apparatus in FIG. 1 according to the section A-A, FIG. 3 shows an enlarged view of the section A-A of FIG. 2 of parts of the cutting means and the support body with a counter-surface corresponding to the double blade, FIG. 4 shows a sectional view of the apparatus in FIG. 1 according to the section B-B, FIG. 5 shows a view according to FIG. 1 in front view, and FIG. 6 shows a view according to FIG. 1 in plan view.

The apparatus shown in the figures serves for automatically separating the breast cartilage or parts thereof from a poultry carcass. The apparatus may be used as an individual machine or as an integral component of a processing line.

FIG. 1 shows a schematic view of the apparatus 10 in side view. The apparatus 10 essentially comprises a transporting conveyor 11 with at least one support body 12 which is designed for receiving and fixing a poultry carcass 13. Conventionally, the transporting conveyor 11 is a revolving transport chain with a plurality of support bodies 12. Other conventional embodiments of the transporting conveyor 11, however, can also be used. By means of the transporting conveyor 11, the poultry carcass 13 fixed to the support body 12 is conveyed in a transporting direction (according to the arrow T), namely along a cutting means 17 which is also a component of the apparatus 10 according to the invention. According to the invention, the cutting means 17 comprises a double blade 18 and a separating element 27 which is arranged in the transporting direction T downstream of the double blade 18.

The poultry carcass 13 is arranged on the support body 12 for processing, such that a connecting line between the breast bone 16 and the breast cartilage 14 of the poultry carcass 13 is oriented parallel to the transporting direction T. In other words, the connecting line extends in the same direction as the transporting direction T.

When conveying the poultry carcass 13, said poultry carcass passes the cutting means 17 for separating the breast cartilage 14 or parts thereof from the poultry carcass 13. The separation of the breast cartilage 14 from the poultry carcass 13 is realised in two steps: initially by longitudinally cutting into the poultry carcass 13 on both sides of the breast cartilage 14 and/or both sides of the breast bone 16 by means of the double blade 18 and then laterally cutting a connecting region 19 or respectively the transverse web left by the longitudinal cutting between the breast cartilage 14 and the breast bone 16 by means of the separating element 27.

Details of the cutting means 17 relative to the double blade 18 are revealed, in particular, from FIGS. 2 and 3. According to a preferred embodiment of the invention, the double blade 18 comprises at least two individual blades 20 spaced apart from one another which are aligned parallel to one another. If the poultry carcass 13 fixed to the support body 12 and conveyed in the transporting direction T by the transporting conveyor 11 passes the double blade 18, the poultry carcass 13 is cut into by means of the two individual blades 20 on both sides of the breast cartilage 14 and/or on both sides of the breast bone 16 in the longitudinal direction, i.e. parallel to the transporting direction T, along the breast cartilage 14 and/or the breast bone 16. As previously set forth, the longitudinal cuts may extend over a sub-portion of any length.

The individual blades 20 are preferably fixed blades, the cutting edges thereof being arranged as shown in FIG. 1 inclined to the vertical relative to the transporting direction T. Alternatively, the cutting edges are not inclined to the vertical relative to the transporting direction T, as shown in the drawing, but aligned at least substantially parallel to the transporting direction T, i.e. either arranged parallel to the transporting direction T or inclined by an angle of less than 90° relative to the transporting direction T. According to a further preferred embodiment of the invention, the individual blades 20 are configured as circular blades, which are particularly preferably rotatably driven.

The rotational direction of the circular blades in this case is preferably oriented counter to the transporting direction T.

According to a further preferred embodiment of the invention, the spacing between the individual blades 20 may be adjusted. In other words, the spacing between the two individual blades 20 may be varied in order to adapt said spacing to the anatomical conditions of the poultry carcass 13 to be processed. The adjustment of the spacing between the individual blades 20 cannot only be realised manually but preferably also adaptively during the operation of the apparatus 10, so that the spacing between the individual blades 20 may be individually adapted to the respective poultry carcass 13 to be processed in order to achieve a cutting guidance applied as close as possible to the side of the breast cartilage 14 and/or the breast bone 16. Naturally, such an individual adaptation of the spacing between the individual blades 20 is also possible when using circular blades as individual blades 20. The individual blades 20 are also aligned in parallel with one another. According to an alternative embodiment, the individual blades 20 are not aligned in parallel with one another, but inclined corresponding to one another. In this case, the individual blades 20 may be arranged positioned obliquely to one another, so that the cutting edges of the individual blades 20 do not come into engagement at right angles with the poultry carcass 13, but in each case engage in an inclined manner thereto. In other words, the individual blades 20 may be arranged such that said blades do not exclusively intersect a horizontal plane at right angles but at any other angles. A non-parallel arrangement of the individual blades 20 also encompasses an alignment of the individual blades 20 in which the individual blades 20 are not parallel to the transporting direction T but are arranged inclined at any angle relative to the transporting direction T. In this case, the individual blades 20 form a gap widening or respectively tapering in the transporting direction T.

For longitudinally cutting into the poultry carcass 13, the double blade 18 is arranged so as to be movable from a waiting position into a cutting position and back again. As soon as the poultry carcass 13 conveyed by the transporting conveyor 11 in the transporting direction T passes the double blade 18, the double blade 18 is moved out of the waiting position into the cutting position. The double blade 18 is located in the cutting position for the duration of the longitudinal cutting into the poultry carcass 13. The dwell time of the double blade 18 in the cutting position results from the desired cutting length of the longitudinal cuts as well as a conveying speed of the transporting conveyor 11, by which the poultry carcass 13 is conveyed in the transporting direction T. If the desired cutting length of the longitudinal cuts is achieved, the double blade 18 is then moved back again into the waiting position. For moving the double blade 18 from the waiting position into the cutting position and back, an actuating element 23 is assigned to the double blade 18. In this case, preferably said actuating element is a pneumatic cylinder, a servomotor drive or the like.

The actuating element 23 is preferably connected to a control device (not shown explicitly), which controls the chronological sequence, namely the movement of the double blade 18 depending on a position of the support body 12 with the poultry carcass 13 conveyed in the transporting direction T from the waiting position into the cutting position and back, and at specific times initiates the corresponding movements of the double blade 18. The control device comprises at least one measuring means for determining the position of the poultry carcass 13. For example, the position of the poultry carcass 13 is determined by the measuring means when the poultry carcass 13 enters the apparatus 10. Based on the transporting speed of the transporting conveyor 11 and the known paths between the measuring means and the cutting means 17, by considering the required length of the longitudinal cuts the control device determines the times at which the double blade 18 has to be moved from the waiting position into the cutting position and back.

A further expedient embodiment of the invention is characterised in that a corresponding counter-surface 25 is assigned to the double blade 18. The counter-surface 25 comprises two recesses 26 corresponding to the double blade 18. The recesses 26 are selected to be at least as wide as the blade width of the individual blades 20. Particularly preferably, however, the width of the recesses 26 is selected to be greater than the blade width of the individual blades 20, so that the individual blades 20 never come into contact with the counter-surface 25. In this manner, the spacing between the individual blades 20 may be varied, without being limited by the counter-surface 25. Particularly preferably, the counter-surface 25 is an integral component of the support body 12.

Following the longitudinal cutting into the poultry carcass 13 said poultry carcass passes the separating element 27 arranged downstream of the double blade 18. Details of the separating element 27 can be derived, in particular, from FIG. 4. For the lateral cutting of the connecting region 19 between the breast cartilage 14 and the breast bone 16, the separating element 27 is arranged so as to be movable from a waiting position into a separating position and back. By the term "lateral cutting" is understood in this case the cutting through the connecting region 19 substantially perpendicular or respectively with a vertical component relative to the connecting line between the breast cartilage 14 and breast bone 16. In this case, the lateral cutting also encompasses cutting guidance which encloses any angle of less than 90° relative to the connecting line.

As soon as the poultry carcass 13 conveyed by the transporting conveyor 11 in the transporting direction T passes the separating element 27, the separating element 27 is moved from the waiting position into the separating position. The separating element 27 is located in the separating position for the duration of the lateral cutting into the connecting region 19. In this case, the separating position comprises a region which extends at least from a point at which the separating element 27 first comes into engagement with the connecting region 19, as far as the point at which the separating element 27 then cuts through the connecting region 19 and thus completely separates the breast cartilage 14 from the poultry carcass 13. In other words, the lateral cutting preferably is realised in the connecting region 19 such that the longitudinal cutting lines produced during the longitudinal cutting by the double blade 18 into the poultry carcass 13, when moving the separating element 27 into the separating position, are crossed, so that the breast cartilage 14 is released completely and finally from the poultry carcass 13. The separating element 27 carries out a type of chopping motion for the separation.

For moving the separating element 27 from the waiting position into the separating position and back, an actuating element 30 is assigned to the separating element 27. In this case said actuating element is preferably a pneumatic cylinder, a servomotor drive or the like. The actuating element 30 is preferably connected, as is the actuating element 23 of the double blade 18, to the control device which controls the chronological sequence, namely the movement of the separating element 27, depending on a position of the support body 12 with the poultry carcass 13 conveyed in the transporting direction T, from the waiting position into the separating position and back again and at given times producing the corresponding movements of the separating element 27.

The above embodiments for the chronological control of the double blade 18 apply in an analogue manner to the chronological control of the separating element 27 which, however, due to the greater spacing between the measuring means arranged at the inlet of the apparatus 10, is to be activated correspondingly later than the double blade 18. Alternatively, the control device comprises a plurality of measuring means for determining the position of the poultry carcass 13 which in each case may be assigned both to the double blade 18 and the separating element 27.

A further expedient embodiment of the invention is characterised in that the separating element 27 is arranged so as to be movable such that, when moving from the waiting position into the separating position, the separating element 27 has a direction of movement perpendicular to the transporting direction T. According to a further advantageous embodiment of the invention, the separating element 27 is arranged so as to be movable such that, when moving from the waiting position into the separating position, the separating element 27 has a direction of movement oriented in the transporting direction T which is inclined by an angle α to the vertical relative to the transporting direction T. Thus, when moved from the waiting position into the separating position, the separating element 27 is moved in the direction of the transporting direction T at least relative to a partial component. Advantageously, to this end the separating element 27 is pivotably arranged about a rotational axis D. Thus, when pivoting about the rotational axis D, the separating element 27 initially enters the connecting region 19 substantially in a perpendicular manner. During the course of the further pivoting movement, the angle α to the vertical relative to the transporting direction T is altered continuously with the pivoting movement. As a result, the separating element 27 "wanders" with the poultry carcass 13 moved by the transporting conveyor 11, with deeper penetration of the separating element 27 into the connecting region 19 the speed component of the separating element 27 in the transporting direction T also continuously increasing. In this manner, the braking of the poultry carcass 13 and, as a result, possible slipping on the support body 12 is reliably avoided and a precise and accurate cutting guidance with complete removal of the breast cartilage 14 from the poultry carcass 13 is ensured.

Preferably, the poultry carcass 13 is arranged on the support body 11 with the head end leading in the transporting direction T, i.e. with the breast bone 16 facing in the transporting direction T. Thus the poultry carcass 13 is immediately free after the lateral cutting of the connecting region 19 has been carried out. Alternatively, the poultry carcass 13 can also be transported by the apparatus 10 with the head end trailing, i.e. with the breast cartilage 14 leading in the transporting direction T.

According to a further preferred embodiment of the invention, the cutting means 17 is assigned a scraper device 32 which, in particular, is visible in FIGS. 5 and 6 and is arranged upstream of the cutting means 17 relative to the transporting direction T. The scraper device 32 comprises at least two scraper elements 33 which are equipped and designed to be guided on both sides of the poultry carcass 13 to the side of the breast cartilage 14 or respectively the breast bone 16. If the support body 12 with the poultry carcass 13 passes the scraper device 32, the scraper elements 33 are guided towards the breast cartilage 14 or respectively the breast bone 16 of the poultry carcass 13, and the remaining meat located on the breast cartilage 14 is scraped by the relative movement between the poultry carcass 13 conveyed in the transporting direction T relative to the scraper elements 33. Alternatively, the scraper elements 33 are movably arranged in a resilient manner, exerting a predetermined contact force on the breast cartilage 14 or respectively the breast bone 16. According to a further alternative embodiment, the scraper elements 33 are stationarily arranged.

The invention claimed is:

1. Apparatus which is designed and equipped for completely removing at least one part of the breast cartilage from a poultry carcass that is free of breast meat, comprising a transporting conveyor for conveying the poultry carcass in a transporting direction T having at least one support body for receiving and fixing the poultry carcass, a cutting means for separating the breast cartilage or parts thereof from the poultry carcass and a control device for controlling the cutting means, characterised in that
the transporting conveyor is aligned with the at least one support body and driven such that a poultry carcass to be arranged on the support body, the poultry carcass having a connecting line between the breast bone and the breast cartilage, is oriented with the connecting line parallel to the transporting direction T,
the cutting means comprises a double blade which is designed and equipped for longitudinally cutting into the poultry carcass at least along a sub-portion on both sides of the breast cartilage and/or both sides of the breast bone, and
the cutting means comprises a separating element arranged downstream of the double blade, which is designed and equipped for laterally cutting a connecting region between the breast cartilage and the breast bone, thereby completely removing the breast cartilage from the poultry carcass.

2. Apparatus according to claim 1, characterised in that the double blade is arranged so as to be movable from a waiting position into a cutting position and back.

3. Apparatus according to claim 1, characterised in that the double blade comprises at least two individual blades spaced apart from one another, wherein the individual blades are aligned at least substantially parallel to one another.

4. Apparatus according to claim 3, characterised in that the spacing between the individual blades may be adjusted.

5. Apparatus according to claim 1, characterised in that at least one actuating element is assigned to the double blade for moving the double blade from the waiting position into the cutting position and back.

6. Apparatus according to claim 1, characterised in that a corresponding counter-surface is assigned to the double blade.

7. Apparatus according to claim 6, characterised in that the counter-surface is an integral component of the support body.

8. Apparatus according to claim 1, characterised in that the separating element is arranged so as to be movable from a waiting position into a separating position and back.

9. Apparatus according to claim 8, characterised in that the separating element is movably arranged such that, when moved from the waiting position into the separating position, the separating element has a direction of movement which is perpendicular to the transporting direction T.

10. Apparatus according to claim 8, characterised in that the separating element is movably arranged such that, when moved from the waiting position into the separating position, the separating element has a direction of movement oriented in the transporting direction T, which is inclined by an angle α to a vertical relative to the transporting direction T.

11. Apparatus according to claim 10, characterised in that the separating element is pivotably arranged about a rotational axis D.

12. Apparatus according to claim 8, characterised in that at least one actuating element is assigned to the separating element for moving the separating element from the waiting position into the separating position and back.

13. A method for completely removing at least one part of the breast cartilage from a poultry carcass that is free of breast meat, comprising the steps:
- transporting the poultry carcass in a transporting direction T by a transporting conveyor having at least one support body for receiving and fixing the poultry carcass such that a connecting line between the breast bone and the breast cartilage of the poultry carcass is oriented parallel to the transporting direction T,
- longitudinally cutting into the poultry carcass at least along a sub-portion on both sides of the breast cartilage and/or both sides of the breast bone by a double blade, and then
- laterally cutting a connecting region between the breast cartilage and the breast bone thereby completely removing the breast cartilage from the poultry carcass by means of a separating element.

14. Method according to claim 13, characterised in that the lateral cutting of the connecting region between the breast cartilage and the breast bone is carried out perpendicular to the transporting direction T.

15. Method according to claim 13, characterised in that the lateral cutting of the connecting region between the breast cartilage and the breast bone is oriented in the transporting direction T and is carried inclined by an angle α to a vertical relative to the transporting direction T.

* * * * *